United States Patent

Washiro et al.

(10) Patent No.: US 10,340,740 B2
(45) Date of Patent: Jul. 2, 2019

(54) POWER RECEIVING UNIT, POWER TRANSMISSION UNIT, AND FEED SYSTEM

(71) Applicant: Sony Corporation, Tokyo (JP)

(72) Inventors: Takanori Washiro, Kanagawa (JP); Masakazu Yajima, Chiba (JP); Kazuo Kikuchi, Kanagawa (JP); Takayuki Hirabayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 98 days.

(21) Appl. No.: 15/358,228

(22) Filed: Nov. 22, 2016

(65) Prior Publication Data

US 2017/0077758 A1 Mar. 16, 2017

Related U.S. Application Data

(63) Continuation of application No. 14/483,706, filed on Sep. 11, 2014, now Pat. No. 9,525,292.

(30) Foreign Application Priority Data

Oct. 10, 2013 (JP) ................. 2013-212711

(51) Int. Cl.
| | | |
|---|---|---|
| *H02J 7/00* | (2006.01) |
| *H04J 7/02* | (2006.01) |
| *H01F 38/00* | (2006.01) |
| *H02J 50/05* | (2016.01) |
| *H02J 50/10* | (2016.01) |
| *H02J 50/12* | (2016.01) |
| *H02J 50/60* | (2016.01) |
| *H02J 50/90* | (2016.01) |
| *H02J 7/02* | (2016.01) |
| *H02J 17/00* | (2006.01) |

(52) U.S. Cl.
CPC ............ *H02J 50/12* (2016.02); *H01F 38/00* (2013.01); *H02J 7/0042* (2013.01); *H02J 7/025* (2013.01); *H02J 17/00* (2013.01); *H02J 50/05* (2016.02); *H02J 50/10* (2016.02); *H02J 50/60* (2016.02); *H02J 50/90* (2016.02)

(58) Field of Classification Search
None
See application file for complete search history.

(56) References Cited

U.S. PATENT DOCUMENTS

| | | | |
|---|---|---|---|
| 2,027,996 A * | 1/1936 | Mishima | B01D 35/06 148/310 |
| 5,455,467 A | 10/1995 | Young et al. | |
| 5,816,825 A | 10/1998 | Sekimori et al. | |
| 2007/0072442 A1 | 3/2007 | DiFonzo et al. | |
| 2007/0072443 A1 | 3/2007 | Rohrbach et al. | |

(Continued)

FOREIGN PATENT DOCUMENTS

| | | |
|---|---|---|
| JP | 2004-260917 A | 9/2004 |
| JP | 2010-272628 A | 12/2010 |

(Continued)

*Primary Examiner* — Jared Fureman
*Assistant Examiner* — Joel Barnett
(74) *Attorney, Agent, or Firm* — Michael Best & Friedrich LLP

(57) ABSTRACT

A power receiving unit includes: a power receiving section configured to receive electric power from a power transmission unit; and an electromagnet configured to be magnetized based on the electric power received from the power transmission unit.

24 Claims, 10 Drawing Sheets

(56) References Cited

U.S. PATENT DOCUMENTS

| | | |
|---|---|---|
| 2007/0230227 A1 | 10/2007 | Palmer |
| 2009/0085408 A1 | 4/2009 | Bruhn |
| 2009/0206675 A1 | 8/2009 | Camurati et al. |
| 2009/0206800 A1 | 8/2009 | Kudou |
| 2009/0212637 A1 | 8/2009 | Baarman et al. |
| 2010/0207771 A1 | 8/2010 | Trigiani |
| 2010/0233889 A1 | 9/2010 | Kiani et al. |
| 2012/0112552 A1* | 5/2012 | Baarman ............... H02J 7/025 307/104 |
| 2012/0235636 A1* | 9/2012 | Partovi ............... H02J 7/025 320/108 |
| 2012/0298030 A1* | 11/2012 | Lee ............... B63G 8/08 114/337 |

FOREIGN PATENT DOCUMENTS

| | | |
|---|---|---|
| JP | 2011-160518 A | 8/2011 |
| JP | 2011-160535 A | 8/2011 |

* cited by examiner

POWER RECEIVING UNIT, POWER TRANSMISSION UNIT, AND FEED SYSTEM

CROSS REFERENCE TO RELATED APPLICATIONS

This is a Continuation Application of patent application Ser. No. 14/483,706, filed Sep. 11, 2014, which claims priority to Japanese Patent Application No.: 2013-212711, filed with the Japan Patent Office on Oct. 10, 2013, the entire contents of which are incorporated herein by reference.

BACKGROUND

The present disclosure relates to a power receiving unit such as an electronic device terminal, a power transmission unit supplying power to the power receiving unit, and a feed system using the power receiving unit and the power transmission unit.

In recent years, attention has been given to a feed (charging) system (wireless feed system, or a non-contact feed system) that may perform wireless (non-contact) electric power supply to, for example, a consumer electronics device (CED) such as a mobile phone, a smartphone, and a mobile music player. This may allow charging, for example, by merely placing an electronic device (a secondary-side device) on a charging tray (a primary-side device), without using (connecting) a connector of a power-supply device such as an alternating current (AC) adapter. In other words, terminal connection between the electronic device and the charging tray is unnecessary.

Such a wireless feed system may be discussed in, for example, Japanese Unexamined Patent Application Publication Nos. 2011-160535, 2011-160518, 2004-260917, and 2010-272628.

SUMMARY

However, in the above-described wireless feed system, the electronic device may become misaligned during feeding, which may stop the power supply in midstream, or may reduce efficiency. Therefore, it has been expected to achieve a power receiving unit, a power transmission unit, and a feeding system that are capable of performing efficient feeding, by suppressing such a misalignment.

It is desirable to provide a power receiving unit, a power transmission unit, and a feeding system that are capable of performing efficient feeding.

According to an embodiment of the present disclosure, there is provided a power receiving unit including: a power receiving section configured to receive electric power from a power transmission unit; and an electromagnet configured to be magnetized based on the electric power received from the power transmission unit.

According to an embodiment of the present disclosure, there is provided a power transmission unit including: a power transmission section configured to supply electric power to a power receiving unit; and a fixing section including a material to be attracted to a magnet, wherein the power receiving unit includes a power receiving section configured to receive the electric power from the power transmission section, and an electromagnet configured to be magnetized based on the electric power received from the power transmission section.

According to an embodiment of the present disclosure, there is provided a feed system including: a power receiving unit and a power transmission unit configured to allow feeding by being brought into contact with or proximity to each other, wherein the power receiving unit includes a power receiving section configured to receive electric power from the power transmission unit, and an electromagnet configured to be magnetized based on the electric power received from the power transmission unit, and the power transmission unit includes a power transmission section configured to supply the electric power to the power receiving unit, and a fixing section including a material to be attracted to a magnet.

The power receiving unit according to the above-described embodiment of the present disclosure includes the power receiving section configured to receive the electric power from the power transmission unit, and the electromagnet configured to be magnetized based on the received electric power. Therefore, the power receiving unit is allowed to receive electric power, in a state of being attracted to a predetermined power transmission unit. In a power receiving period, due to the attraction to the power transmission unit, a misalignment is less likely to occur and favorable electric power transmission efficiency is achieved.

The power transmission unit according to the above-described embodiment of the present disclosure includes the power transmission section configured to supply the electric power to the power receiving unit, and the fixing section including the material to be attracted to the magnet. The power receiving unit includes the power receiving section configured to receive the electric power from the power transmission section, and the electromagnet configured to be magnetized based on the received electric power. Therefore, the power transmission unit is allowed to perform electric power supply, in a state of having the power receiving unit attracted thereto. In a power transmission period, due to the attraction of the power receiving unit, a misalignment thereof is less likely to occur and favorable electric power transmission efficiency is achieved.

The feed system according to the above-described embodiment of the present disclosure includes the power receiving unit and the power transmission unit, which correspond to the power receiving unit and the power transmission unit according to the above-described embodiments of the present disclosure, and are configured to allow feeding by being brought into contact with or proximity to each other. Therefore, the feed system is allowed to perform feeding in a state in which the power receiving unit is attracted to the power transmission unit. In a feeding period, due to the attraction of the power receiving unit to the power transmission unit, a misalignment is less likely to occur and favorable electric power transmission efficiency is achieved.

According to the power receiving unit in the above-described embodiment of the present disclosure, there are provided the power receiving section configured to receive the electric power from the power transmission unit, and the electromagnet configured to be magnetized based on the received electric power. Therefore, the power receiving unit is allowed to receive electric power, in a state of being attracted to a predetermined power transmission unit. Hence, a misalignment is suppressed and favorable electric power transmission efficiency is achievable. Accordingly, efficient feeding is allowed to be performed.

According to the power transmission unit in the above-described embodiment of the present disclosure, there are provided the power transmission section configured to supply the electric power to the power receiving unit, and the fixing section including the material to be attracted to the magnet. The power receiving unit includes the power receiving section configured to receive the electric power from the power transmission section, and the electromagnet configured to be magnetized based on the received electric power. Therefore, the power transmission unit is allowed to perform electric power supply, in a state of having the power receiving unit attracted thereto. Hence, a misalignment of the power receiving unit is suppressed and favorable electric power transmission efficiency is achievable. Accordingly, efficient feeding is allowed to be performed.

According to the feed system in the above-described embodiment of the present disclosure, there are provided the power receiving unit and the power transmission unit, which correspond to the power receiving unit and the power transmission unit in the above-described embodiments of the present disclosure, and are configured to allow feeding by being brought into contact with or proximity to each other. Therefore, the feed system is allowed to perform feeding in a state in which the power receiving unit is attracted to the power transmission unit. Hence, a misalignment of the power receiving unit is suppressed and favorable electric power transmission efficiency is achievable. Accordingly, efficient feeding is allowed to be performed.

The above-described contents have been provided as an example of the present disclosure. Effects of the present disclosure are not limited to those described above, and may be other different effects, or may further include other effect.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the present technology, and are incorporated in and constitute a part of this specification. The drawings illustrate embodiments and, together with the specification, serve to describe the principles of the technology.

DETAILED DESCRIPTION

Some embodiment and modifications of the present disclosure will be described below in detail with reference to the drawings. It is to be noted that the description will be provided in the following order.
1. Embodiment (an example of a feed system using an electronic device including an electromagnet built therein)
2. Modification 1 (an example of a case in which a current flowing to the electromagnet is controlled)
3. Modification 2 (another layout example of an electrode provided in a charger)
4. Modification 3 (other installation examples of the charger and the electronic device)

Embodiment

Figure 1:
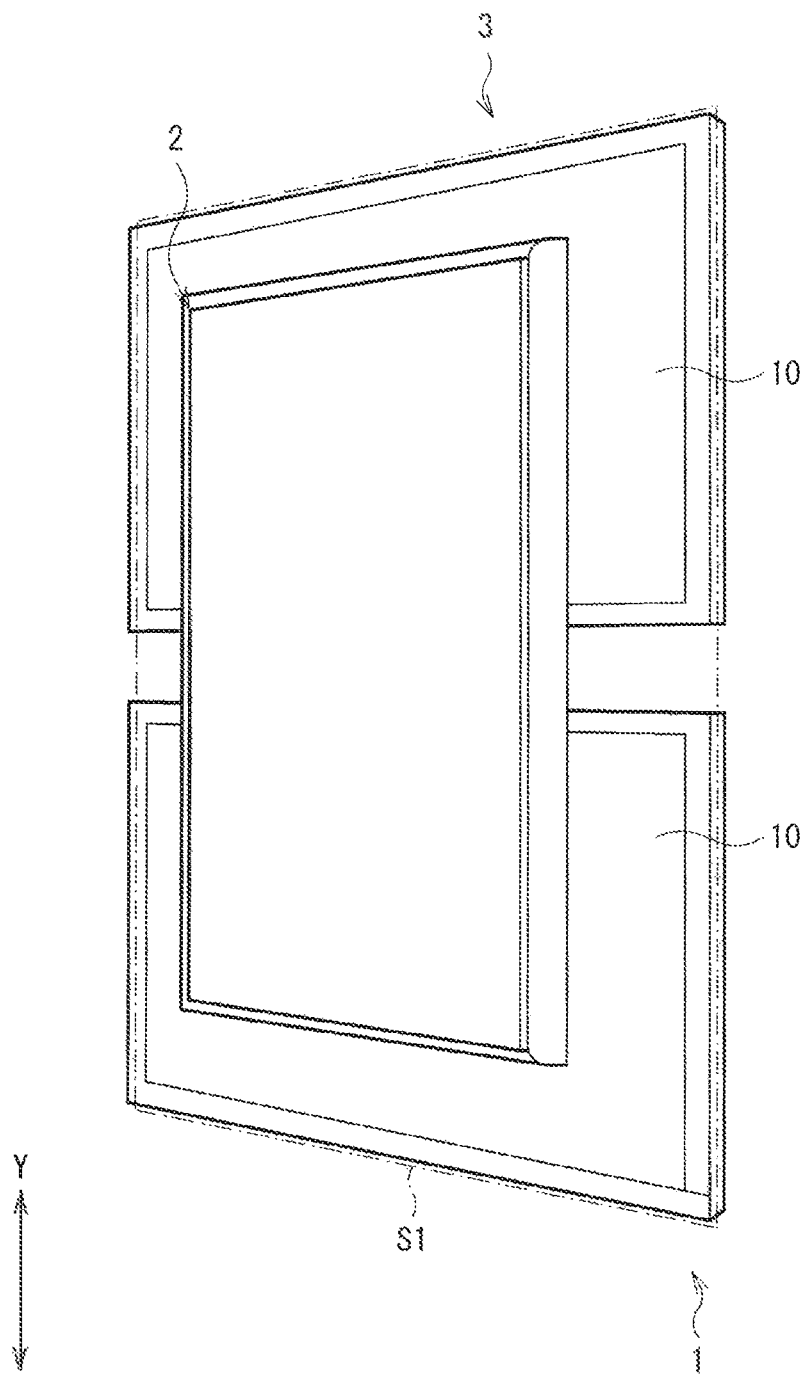
FIG. 1 is a diagram illustrating an appearance of a feed system according to an embodiment of the present disclosure.
Figure 2:
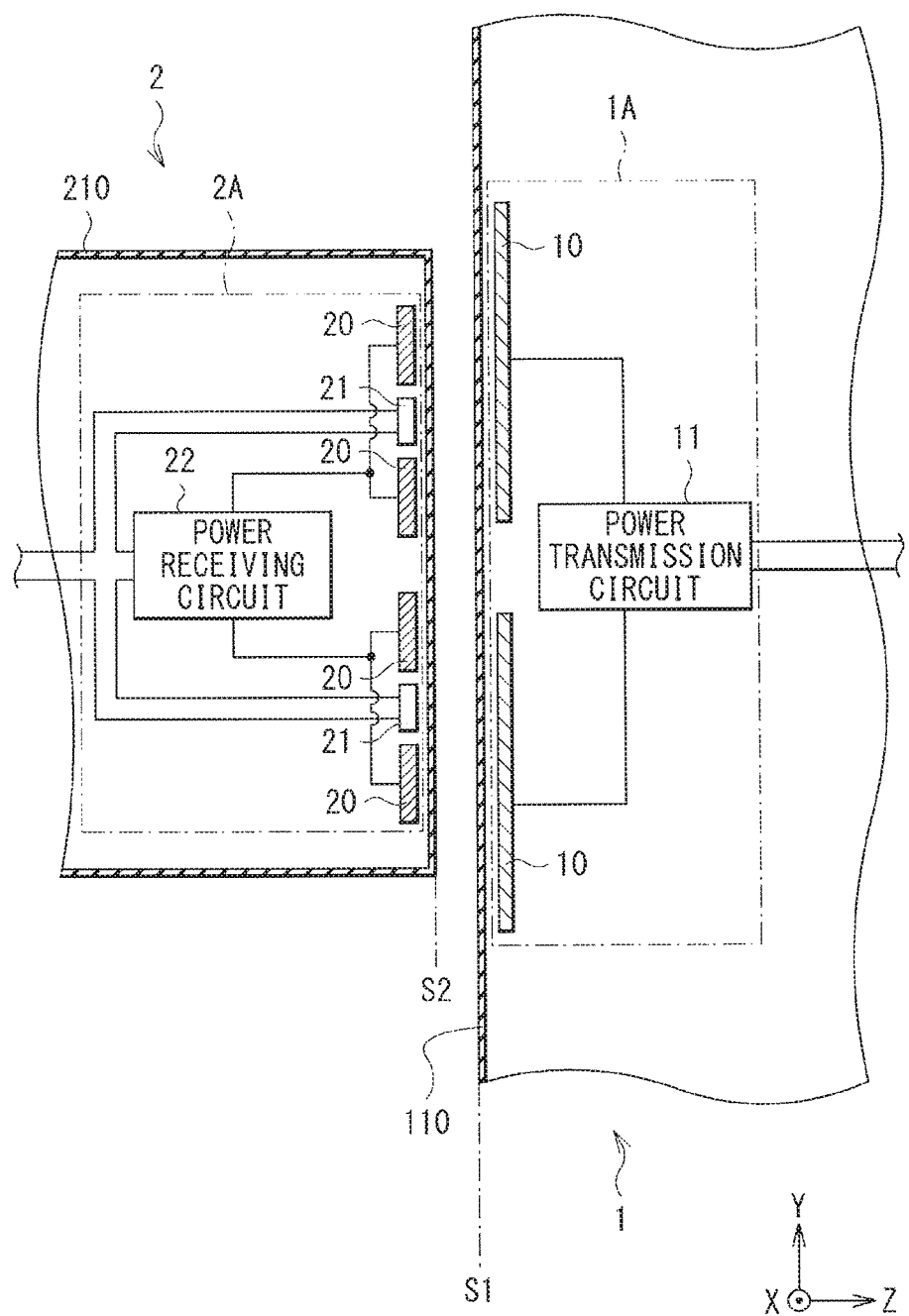
FIG. 2 is a cross-sectional schematic diagram illustrating a main-part configuration of the feed system illustrated in FIG. 1.
Figure 3:
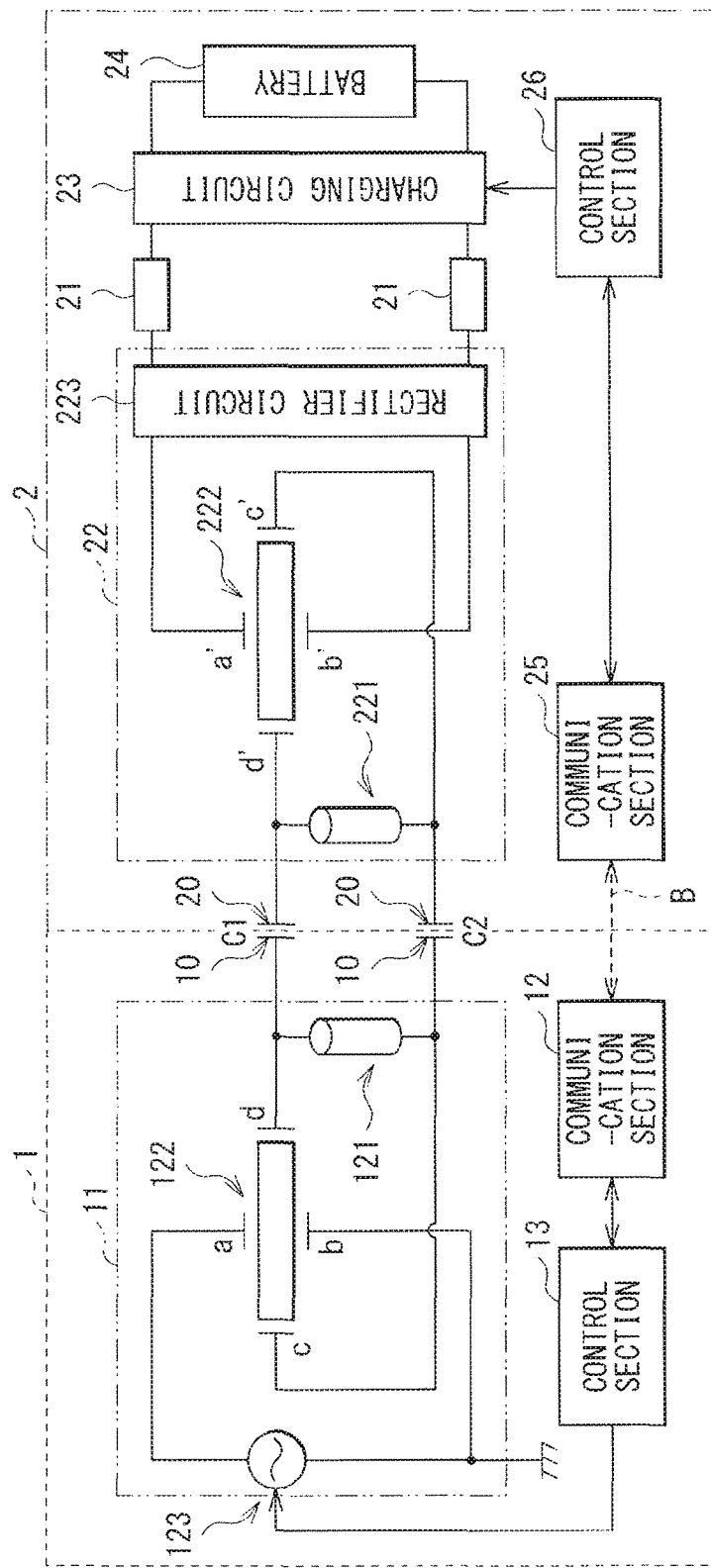
FIG. 3 is a functional block diagram illustrating an overall configuration of the feed system illustrated in FIG. 2.

[Configuration]
FIG. 1 illustrates an example of an appearance configuration of a feed system (a feed system 3) according to an embodiment of the present disclosure. FIG. 2 illustrates a main-part configuration of the feed system 3. FIG. 3 is a functional block diagram illustrating an overall configuration of the feed system 3.

The feed system 3 may be a system that performs wireless feeding (charging, or electric power transmission) between a primary-side device and a secondary-side device by, using, for example, an electric field or a magnetic field (for example, by an electric field coupling method, a magnetic resonance method, or an electromagnetic induction method). The feed system 3 includes a charger 1 (a power transmission unit) as the primary-side device, and an electronic device 2 (a power receiving unit) as the secondary-side device. The feed system 3 performs feeding in a state in which the charger 1 and the electronic device 2 are in contact with (or in proximity to) each other. Here, a configuration and operation of the feed system 3 that performs feeding by an electric field coupling method will be described as an example.

In the feed system 3, the charger 1 and the electronic device 2 have a power transmission surface S1 and a power receiving surface S2, respectively, which are capable of being in contact with (or in proximity to) each other. For example, the area of the power transmission surface S1 may be larger than the area of the power receiving surface S2. As will be described later in detail, electric power supply from the charger 1 to the electronic device 2 is performed by placing the electronic device 2 so that the power receiving surface S2 is in contact with the power transmission surface S1 of the charger 1. It is to be noted that a state in which one electronic device 2 is in contact with one charger 1 is illustrated in FIG. 1, etc. However, feeding may be performed in a state in which two or more electronic devices 2 are in contact with one charger 1.

In the feed system 3, the charger 1 is installed so that the charger 1 and the electronic device 2 come in contact with each other on a vertical plane (an XY plane) (hereinafter referred to as "vertical installation"). In other words, a power transmission section 1A (to be described later) is provided along a vertical plane, so that the power transmission surface S1 of the charger 1 becomes the vertical plane. Examples of an installation site of the charger 1 described above may include indoor wall surfaces and pillars of buildings such as stores and houses.

[Charger 1]

The charger 1 includes the power transmission section 1A in proximity to the power transmission surface S1 (next to the power transmission surface S1) (FIG. 2), and further includes a communication section 12 and a control section 13 (FIG. 3). The power transmission section 1A may be covered by a housing (a cover) 110 made of an insulating material, for example, and a surface of the housing 110 serves as the power transmission surface S1. The power transmission section 1A is a part that supplies electric power to a power receiving section 2A of the electronic device 2, and may include, for example, a first electrode 10 and a power transmission circuit 11.

The first electrode 10 may be, for example, a flat-shaped electrode having a surface parallel to the power transmission surface S1. For example, a plurality of (here, two) first electrodes 10 may be disposed with a predetermined space therebetween. A material of the first electrode 10 may be a typical electrode material. However, in the present embodiment, the first electrode 10 is made of a material to be attracted to a magnet, and serves also as a "fixing section" in one embodiment of the present disclosure (the first electrode 10 functions as the "fixing section"). For such a material, iron (Fe), nickel (Ni), or cobalt (Co), or a material including any of iron, nickel, and cobalt may be used. The first electrode 10 is an electrode to be paired with (to be disposed to face) a second electrode 20 provided in the electronic device 2 to be described later. The first electrode 10 forms a capacitance C1 or C2, together with the second electrode 20.

The power transmission circuit 11 is connected to the two first electrodes 10, and may include, for example, a coil 121, a piezoelectric transformer 122, and an AC-signal generation source 123. Specifically, the coil 121 is connected in series to each of the first electrodes 10 (to one end of each of the capacitances C1 and C2), and output terminals "c" and "d" of the piezoelectric transformer 122 are connected to the respective first electrodes 10. Input terminals "a" and "b" of the piezoelectric transformer 122 are connected to respective output terminals of the AC-signal generation source 123.

The AC-signal generation source 123 may be, for example, a power supply that generates, based on, for example, a control signal supplied from a control section 13, a pulse signal of 10 to 24 (Vp-p) by using electric power supplied from a not-illustrated external power supply. The piezoelectric transformer 122 may be a transformer that converts a voltage inputted from an AC-signal generation source 123, to make the inputted voltage become several tens of times higher, and outputs this higher voltage. This allows the first electrode 10 side of each of the capacitances C1 and C2 to have a high pressure, and to reduce a supply current to a mA order. This contributes to heat generation suppression of the first electrode 10. The coil 121 is provided for impedance matching, and has a role of lowering the impedance on the power transmission side.

The communication section 12 performs predetermined mutual communication operation with a communication section 25 to be described later in the electronic device 2 (see an arrow B in FIG. 3).

The control section 13 performs various kinds of control operation in the entire charger 1 (or the entire feed system 3). Specifically, the control section 13 controls power transmission operation by the power transmission section 1A and communication operation by the communication section 12. In addition, the control section 13 may have, for example, a function of controlling optimization of supplied electric power and authenticating a device to be fed, a function of detecting a device to be fed being in proximity thereto, and a function of detecting admixture of a substance such as dissimilar metal. The control section 13 may be configured using, for example, a microcomputer, a pulse generator, and the like.

[Electronic Device 2]

The electronic device 2 may be, for example, any of stationary electronic devices represented by television receivers, mobile electronic devices containing a rechargeable battery (a battery) represented by mobile phones, smartphones, and digital cameras, and the like. The electronic device 2 includes the power receiving section 2A and an electromagnet 21 (FIG. 2) provided in proximity to the power receiving surface S2 (next to the power receiving surface S2). The electronic device 2 further includes a charging circuit 23, a battery 24 (a load), the communication section 25, and a control section 26 (FIG. 3). The power receiving section 2A may be covered by a housing (a cover) 210 made of an insulating material, for example, and a part of a surface of the housing 210 serves as the power receiving surface S2. The power receiving section 2A is a part that receives electric power from the power transmission section 1A of the charger 1, and may include, for example, the second electrode 20 and a power receiving circuit 22. The electromagnet 21 is to be magnetized based on the electric power received by the power receiving section 2A.

The second electrode 20 may be, for example, a flat-shaped electrode having a surface parallel to the power receiving surface S2. For example, a plurality of (here, two) second electrodes 20 are disposed with a predetermined space therebetween. A material of the second electrode 20 may be a typical electrode material. The second electrode 20 is an electrode to be paired with (to be disposed to face) the corresponding first electrode 10 provided in the charger 1, and form the capacitance C1 or C2 with the corresponding first electrode 10.

Figure 4:
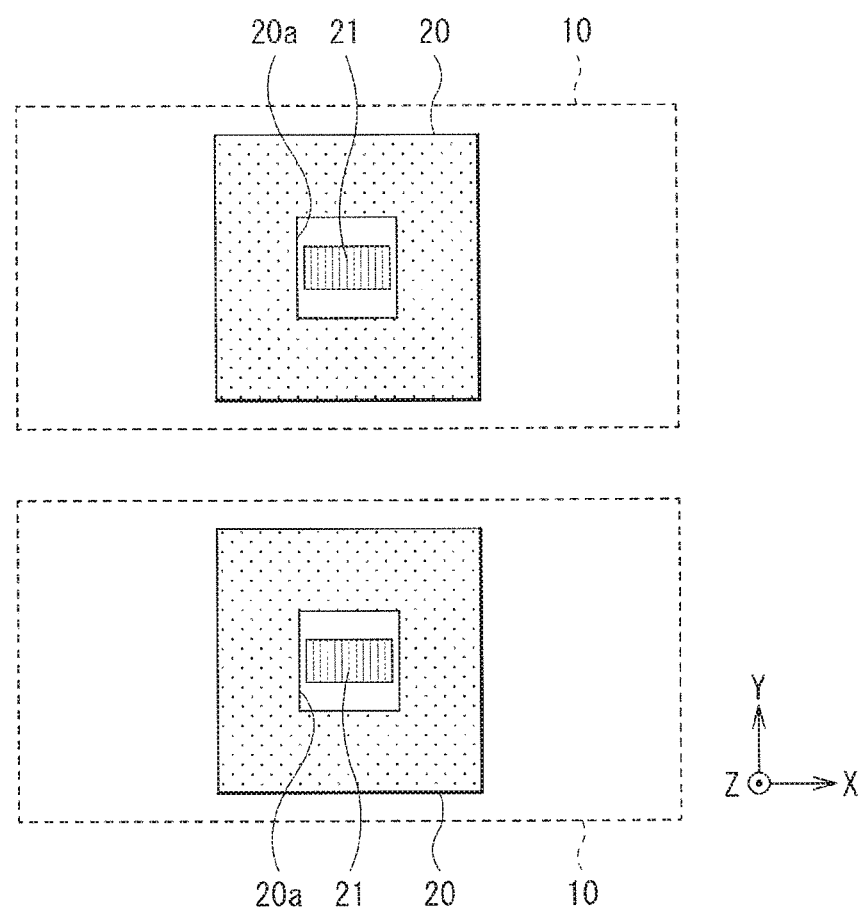
FIG. 4 is a schematic diagram illustrating a layout example of an electrode in each of an electronic device and a charger.

FIG. 4 schematically illustrates an example of an XY plane configuration between the first electrode 10 of the charger 1 and the second electrode 20 of the electronic device 2. As illustrated in FIG. 4, for example, the two first electrodes 10 and the two second electrodes 20 are in a layout to be arranged to face each other. Here, the area of the first electrode 10 is designed to be larger than the area of the second electrode 20. As described above, the first electrode 10 and the second electrode 20 form each of the capacitances C1 and C2. Therefore, in the XY plane, the second electrode 20 may be desirably arranged (aligned) to overlap a formation region of the first electrode 10 at the time of feeding. Further, in order to suppress generation of a parasitic capacitance and to suppress generation of abnormal heat, it may be desirable to prevent foreign matter (such as a metal piece, in particular) from being placed over each of a region between the first electrodes 10 and a region between the second electrodes 20.

In such a layout, an opening 20a may be provided, for example, in a selective region (here, a central part) of the second electrode 20. The electromagnet 21 is disposed in the opening 20a. Therefore, when the electromagnet 21 is magnetized while the first electrode 10 and the second electrode 20 are arranged to face each other, the first electrode 10 made of the above-described predetermined material is attracted to the electromagnet 21. Accordingly, in the above-described layout, the electronic device 2 is attracted to the charger 1 in a state in which the first electrode 10 and the second electrode 20 are arranged to face each other. However, the above-described layout is provided as an example, and any of other various layouts may be adopted. The first electrodes 10 and the second electrodes 20 are not limited in particular in terms of planar shape and quantity, and any of various shapes and quantities may be adopted according to a use.

For example, the electromagnet 21 is formed by winding a coil around a core made of a magnetic material, and is magnetized by energizing this coil. The electromagnet 21 is electrically connected in series between the power receiving section 2A (the power receiving circuit 22) and the battery 24. In other words, one end of the coil of the electromagnet 21 is connected to an output terminal of the power receiving circuit 22 (specifically, a rectifier circuit 223 to be described later), and the other end is connected to an input terminal of the charging circuit 23. It is to be noted that it is only necessary for a connection point (a mounting location on the circuit) of the electromagnet 21 to be a direct current (DC) power supply part following the rectifier circuit 223 (to be described later) of the power receiving circuit 22. For example, the electromagnet 21 is connected between the rectifier circuit 223 and the charging circuit 23 in FIG. 3, but may be connected to a path between the charging circuit 23 and the battery 24. Further, a structural mounting location of the electromagnet 21 is not limited to the above-described opening 20a provided in the second electrode 20. For example, the electromagnet 21 may be disposed in parallel with the second electrode 20, without providing the opening 20a in the second electrode 20. Furthermore, the number of the electromagnets 21 is not limited to two, and may be one, or may be three or more.

The power receiving circuit 22 is connected to the above-described two second electrodes 20, and may include, for example, a coil 221, a piezoelectric transformer 222, and the rectifier circuit 223. Specifically, the coil 221 is connected in series to each of the second electrodes 20 (one end of each of the capacitances C1 and C2), and input terminals "c" and "d" of the piezoelectric transformer 222 are connected to the respective second electrodes 20. Output terminals "a" and "b" of the piezoelectric transformer 222 are connected to respective input terminals of the rectifier circuit 223.

The coil 221 is provided for impedance matching, and has a role of increasing impedance on the power receiving side. The piezoelectric transformer 222 converts an input voltage into a voltage that is one several tenth of the input voltage, and outputs this voltage obtained by the conversion to the rectifier circuit 223. The rectifier circuit 223 rectifies a receiving voltage (an AC voltage) supplied from the piezoelectric transformer 222, and generates a DC voltage.

Based on the DC power (the DC voltage) outputted from the rectifier circuit 223 of the power receiving circuit 22, the charging circuit 23 performs charging operation for the battery 24 serving as the load.

The battery 24 stores electric power according to the charging operation performed by the charging circuit 23, and may be configured, for example, using a rechargeable battery (a secondary battery) such as a lithium ion battery.

The communication section 25 performs the above-described predetermined mutual communication operation with the communication section 12 in the charger 1 (see the arrow B in FIG. 3).

The control section 26 performs various kinds of control operation in the entire electronic device 2 (or the entire feed system 3). Specifically, the control section 26 controls the power receiving operation by the power receiving section 2A and the communication operation by the communication section 25. In addition, the control section 26 may have, for example, a function of controlling optimization of the received electric power and controlling of the charging operation of the charging circuit 23.

[Functions and Effects]

Figure 5:
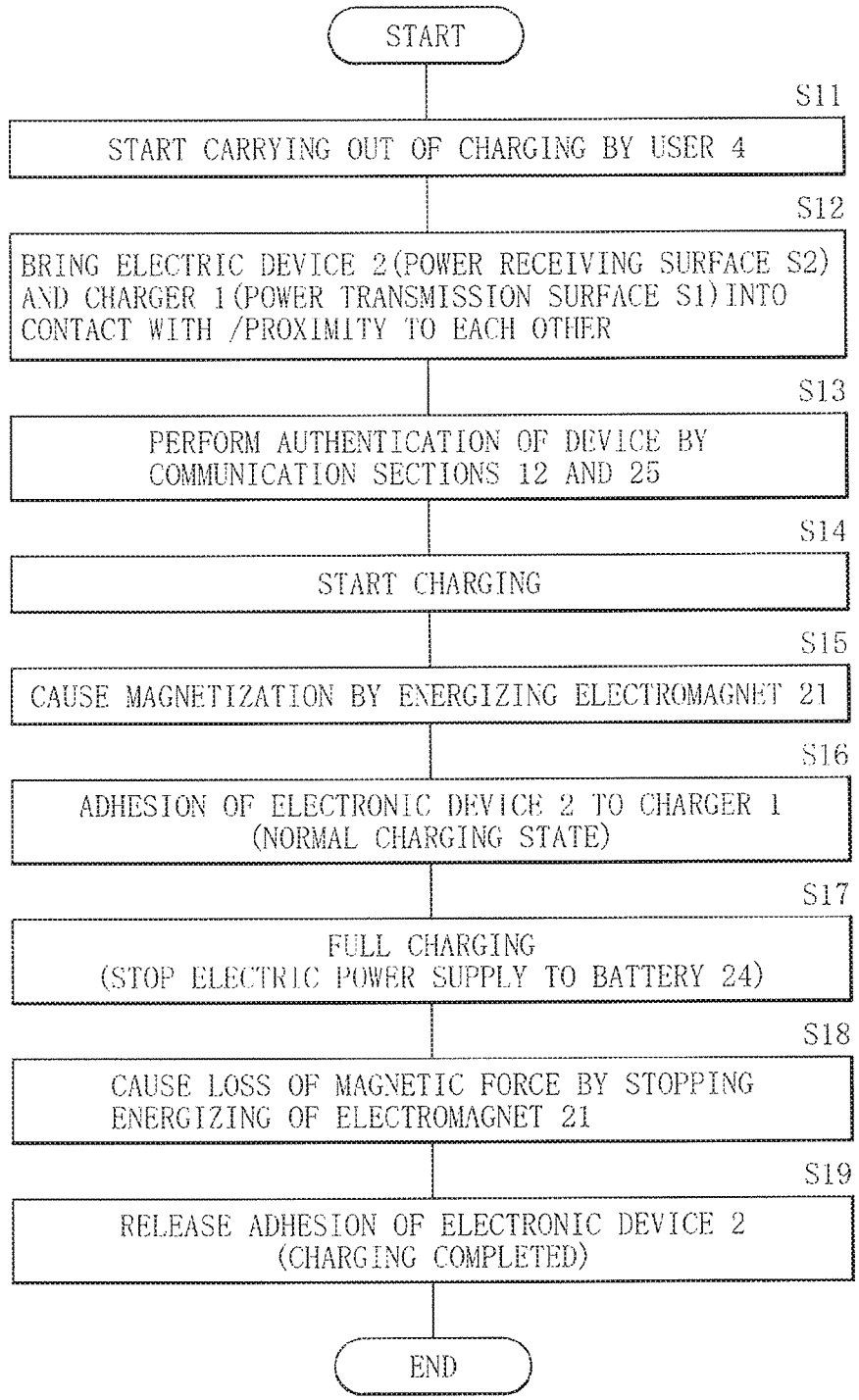
FIG. 5 is a flowchart illustrating a flow of feeding operation of the feed system illustrated in FIG. 1.
Figure 6:
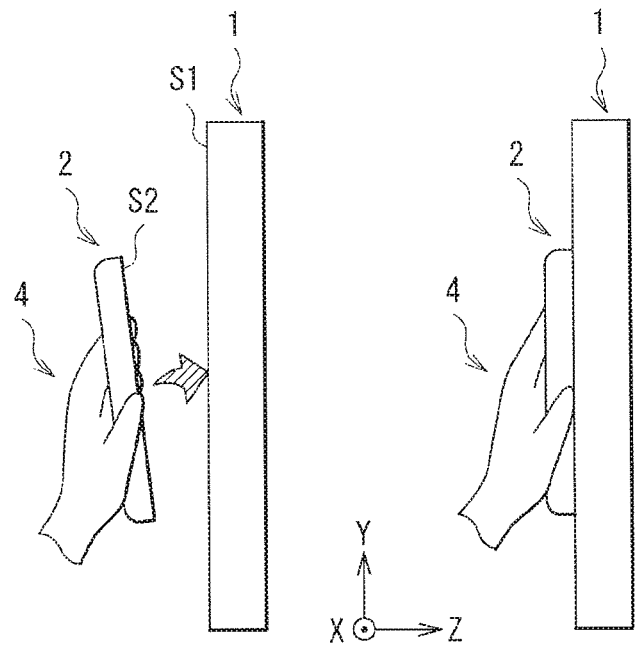
FIG. 6 is a schematic diagram illustrating an operation example of the feed system illustrated in FIG. 1.
Figure 7:
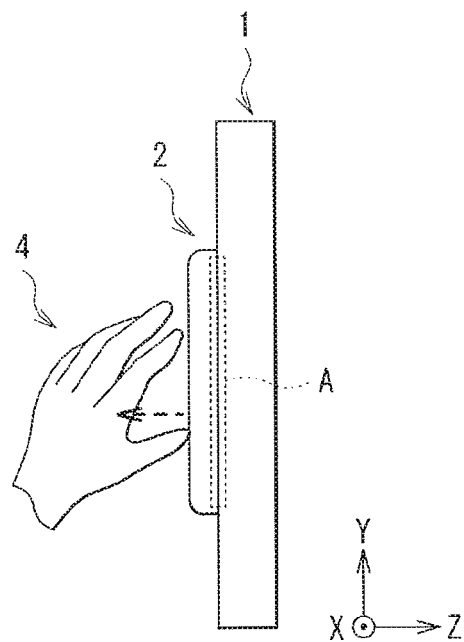
FIG. 7 is a schematic diagram illustrating an operation example of the feed system illustrated in FIG. 1.
Figure 8:
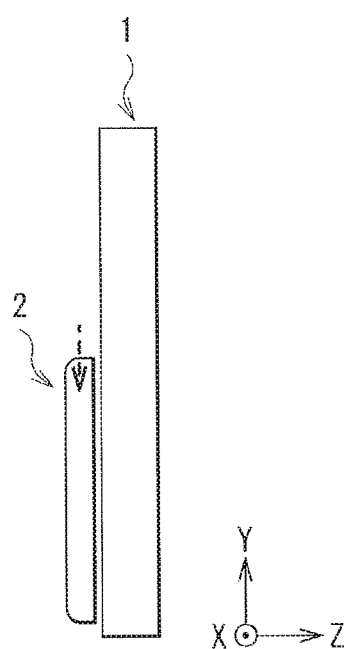
FIG. 8 is a schematic diagram illustrating an operation example of the feed system illustrated in FIG. 1.

FIG. 5 illustrates a flow of operation (state) from start to end of the feeding (charging) of the above-described feed system 3. FIGS. 6 to 8 each schematically illustrate operation in each step illustrated in FIG. 5.

In the feed system 3, at first, for example, as illustrated in a left part and a right part of FIG. 6, when carrying out charging, a user 4 holding the electronic device 2 by a hand may bring the electronic device 2 closer to the charger 1 so that the power receiving surface S2 and the power transmission surface S1 face each other. Subsequently, the user 4 may bring the electronic device 2 into contact with (into proximity to) the charger 1 (in step S11 and step S12 of FIG. 5).

Next, in the charger 1 and the electronic device 2, authentication is performed to determine whether the electronic device 2 is the device to be fed of the charger 1, through the communication between the communication sections 12 and 25 (step S13). Specifically, for example, the control section 13 may confirm that a standard of the electronic device 2 is compatible with a standard (a wireless charging standard) of the charger 1. The flow then proceeds to the next step.

Upon receipt of an authentication result (a result indicating that the standard is compatible), the charger 1 starts electric power supply from the power transmission section 1A towards the power receiving section 2A by controlling the control section 13 (step S14). Specifically, based on electric power supplied from an external power supply, the AC-signal generation source 123 of the power transmission circuit 11 supplies an AC voltage used to perform power transmission, to the first electrode 10 through the piezoelectric transformer 122. As a result, between the power transmission section 1A and the power receiving section 2A, electric power transmission is performed through the capacitances C1 and C2 formed by the first electrodes 10 and the second electrodes 20. The AC voltage supplied to the power receiving section 2A is inputted to the power receiving circuit 22, and becomes a DC voltage through the piezoelectric transformer 222 and the rectifier circuit 223. This DC voltage is then supplied to the charging circuit 23.

Next, based on the DC voltage supplied to the charging circuit 23, charging of the battery 24 is performed. In this way, in the electronic device 2, the charging operation based on the electric power received by the power receiving section 2A is performed.

Here, in the present embodiment, the electromagnet 21 is electrically connected in series between the power receiving section 2A and the battery 24. For this reason, during a period in which the charging (power receiving) of the electronic device 2 is performed, a current is supplied from the power receiving section 2A to the battery 24, so that the electromagnet 21 is energized. Therefore, the electromagnet 21 is magnetized, and serves as a magnet (step S15).

On the other hand, in the charger 1, the first electrode 10 is configured of the material to be attracted to the magnet (also serves as the fixing section made of a material to be attracted to a magnet). Therefore, as illustrated in FIG. 7, the electronic device 2 is attracted to the charger 1 by the magnetization of the electromagnet 21 (step S16). As a result, the power transmission section 1A and the power receiving section 2A are in a state of being in tight contact with each other in a region A. At this moment, as illustrated in FIG. 4, for example, since the electromagnet 21 is disposed in the opening 20a of the second electrode 20, the electronic device 2 may be attracted to the charger 1 so that the first electrode 10 and the second electrode 20 face each other.

In this way, the electromagnet 21 is magnetized based on the received electric power and therefore, the electronic device 2 is attracted and fixed to the charger 1, in a power receiving period of the electronic device 2. As a result, for example, even if the user 4 moves the hand off the electronic device 2, a charging state may autonomously continue at the fixed position. Therefore, in a feeding period, a misalignment between the charger 1 and the electronic device 2 is suppressed.

In addition, since the feeding is performed in the state in which the charger 1 and the electronic device 2 are in tight contact with each other, a space between the power transmission section 1A (the first electrode 10) and the power receiving section 2A (the second electrode 20) is reduced, and favorable electric power transmission efficiency is achieved. This effect of improving the electric power transmission efficiency is more effective, in particular, in a case of feeding operation by the electric field coupling method described above. This is because, in the electric field coupling method, an electric power transmission distance is shorter than that in a method using a magnetic field and therefore, it is desired to arrange the first electrode 10 and the second electrode 20 more close to each other.

Subsequently, the battery 24 is charged for a predetermined time by the above-described electric power transmission, and when the battery 24 is fully charged, the control section 26 stops the electric power supply to the battery 24 by controlling the charging circuit 23 (step S17).

This stops the energizing of the electromagnet 21, and the electromagnet 21 loses a magnetic force (step S18). As a result, as illustrated in FIG. 8, attraction of the electronic device 2 to the charger 1 is released, which completes the charging (step S19). It is to be noted that when the power transmission section 1A of the charger 1 is provided along the vertical plane as in the present embodiment, for example, a tray or the like may be provided below the charger 1 as a saucer of the electronic device 2, considering that the electronic device 2 falls (slides down) due to the release of the attraction of the electronic device 2.

As described, above, in the present embodiment, the electronic device 2 includes the power receiving section 2A receiving the electric power, and the electromagnet 21 magnetized based on the received electric power. Further, the charger 1 includes the power transmission section 1A provided to supply the electric power, and the first electrode 10 made of the material to be attracted to a magnet. Therefore, in the feeding period, the electronic device 2 is attracted to the charger 1, which allows suppression of misalignment as well as achievement of favorable electric power transmission efficiency. Hence, it is possible to perform effective feeding.

In addition, in the present embodiment, for example, the following effects may be obtained.

When carrying out the charging, the user 4 is allowed to easily confirm that the electronic device 2 is a device supporting the charging standard, by the attraction of the electronic device 2 (an attractive force of the electromagnet 21) after bringing the electronic device 2 into contact with the charger 1. At the same time, the user 4 is allowed to recognize that normal charging (charging at sufficient efficiency) to the battery 24 has started. In other words, since the electromagnet 21 is to be magnetized by the electric power received from the charger 1, the electronic device 2 is not attracted (or not easily attracted) to the charger 1, in a case in which the electronic device 2 does not support the charging standard, or in a state in which normal electric power transmission is not performed for some reason.

Further, when carrying out the charging, ideally, the user 4 brings the electronic device 2 into contact with the charger 1, at a point where the first electrode 10 of the power transmission section 1A and the second electrode 20 of the power receiving section 2A are arranged to face each other (at a point where a loss of electric power is small). Therefore, the user 4 is expected to align (finely adjust the position of) the electronic device 2 with the charger 1, when carrying out the charging. In the present embodiment, as described above, it is possible to recognize the normal charging by the attraction of the electronic device 2. Therefore, for example, if the user 4 slides the electronic device 2 along the power transmission surface S1 of the charger 1 and then moves the hand off the electronic device 2 at a position when feeling the attractive force, the electronic device 2 may be fixed to the position (positioned). In addition, even if the position where the hand is moved off is slightly deviated from the above-described point, the electronic device 2 is guided to the above-described point by the attractive force of the electromagnet 21, and then fixed. Therefore, it is possible to reduce an alignment burden on the user 4.

Moreover, since the feeding is performed in the state in which the electronic device 2 is attracted, efficient feeding may be performed, for example, even in a zero gravity space such as a space station.

[Advantages of Vertical Installation]

When the charger 1 is installed on a wall surface, and feeding operation is performed in a state in which the charger 1 and the electronic device 2 are in contact with each other on a vertical plane (when the charger 1 is installed vertically), the following effects are further obtained in addition to the above-described effects. In other words, for example, as compared with a case in which the charger 1 is installed along a horizontal plane (installed horizontally), it is possible to suppress interposition of foreign matter between the charger 1 and the electronic device 2. In the electric field coupling method, when foreign matter is interposed, the first electrodes 10 (or the second electrodes 20) may become shorted to one another due to capacitive coupling, which may cause heat generation. In addition, in the magnetic field method, an eddy current may be generated, which may cause heat generation. It is possible to prevent the heat generation due to the foreign matter, by vertically installing the charger 1.

In addition, as compared with the case of horizontal installation, visibility increases in the feeding period since the electronic device 2 is attracted to the charger 1. This may allow the user, for example, to easily confirm that the electronic device 2 is in a normal charging state. Further, the presence of the electronic device 2 and the charging state (whether the charging is in progress or finished) are easily confirmed, even from a relatively distant location. Furthermore, the user 4 is allowed to recognize the charging state, without using an additional notification means (turning on of a lamp, indication by a display, or the like in the charger 1 or the electronic device 2). Such an improvement of visibility may produce a security effect (may prevent stealing of the electronic device 2), when the charger 1 is installed in a store, for example. In addition, to enhance such a security effect, the attractive power of the electromagnet 21 may be increased by adjusting a current flowing to the electromagnet 21.

Further, when the charging operation is stopped by an event such as the full charging of the battery 24, the energizing of the electromagnet 21 is stopped, and the attraction of the electronic device 2 to the charger 1 is released. In other words, upon completion of the charging, the electronic device 2 falls. Therefore, the user 4 is allowed to readily confirm that the charging is finished (the charging is completed). Furthermore, in the case of the horizontal installation, the electronic device 2 may be left on the charger 1 for a long time after completion of charging, but not in the case of the vertical installation. In the case of the vertical installation, the charger 1 and the electronic device 2 are not left in a state of being in contact with each other and therefore, it is possible to ensure the safety.

In addition, when used in a limited space such as a store in particular, the charger 1 is allowed to be installed, effectively utilizing a free space such as a wall surface and a pillar. Moreover, a large area of the power transmission surface S1 of the charger 1 may be ensured on a wall surface and therefore, it is possible to develop a service that allows a plurality of electronic devices 2 to be charged simultaneously.

Modifications (Modifications 1 to 3) of the above-described embodiment will be described below. It is to be noted that the same components as those of the above-described embodiment will be provided with the same reference numerals as those thereof and will not be described as appropriate.

[Modification 1]

Figure 9:
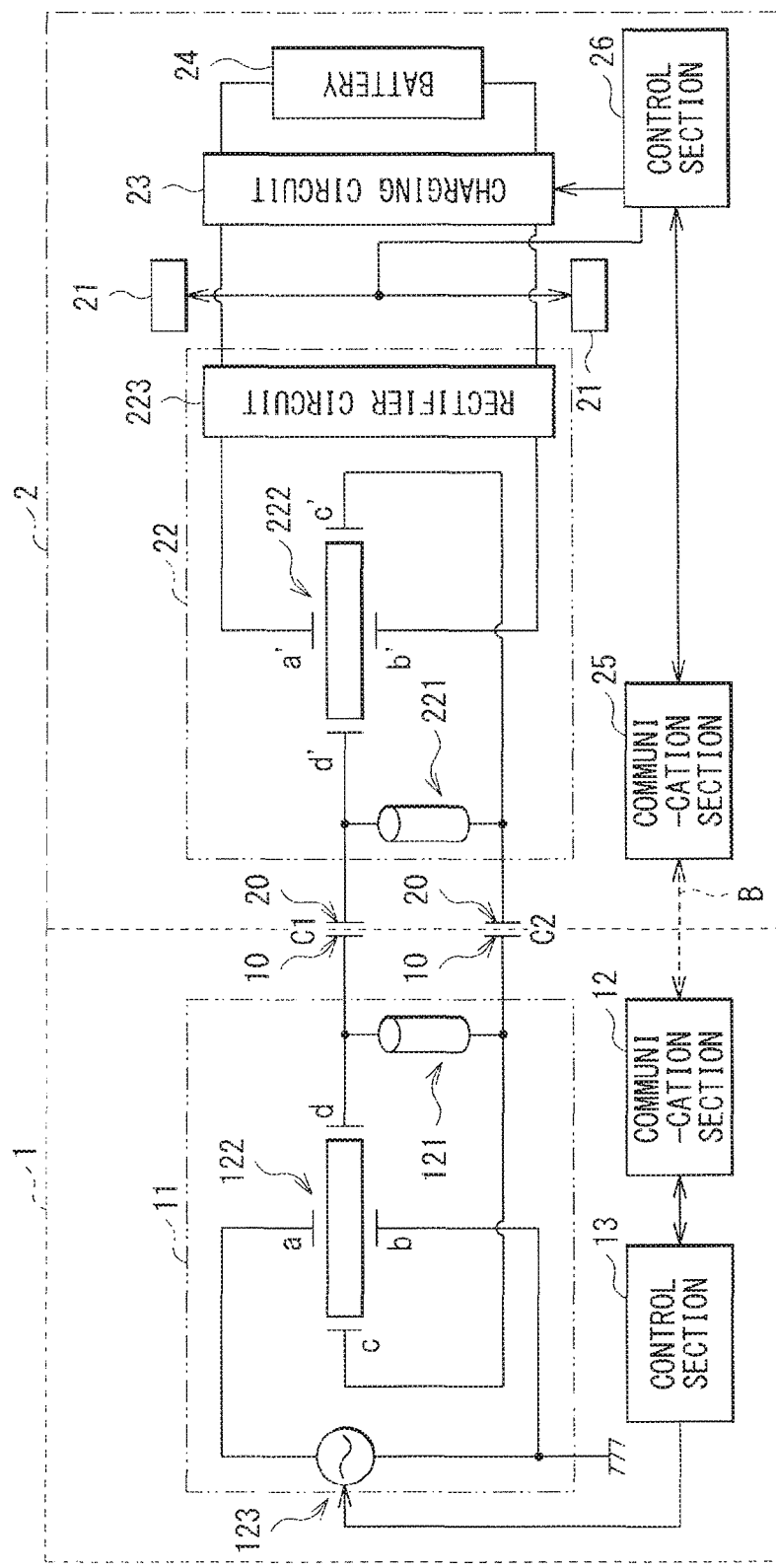
FIG. 9 is a functional block diagram illustrating an overall configuration of a feed system according to Modification 1.

FIG. 9 is a functional block diagram illustrating an overall configuration of a feed system according to Modification 1. In the above-described embodiment, the configuration in which the electromagnet 21 is connected in series between the power receiving section 2A and the battery 24 has been described as an example. However, as in the present modification, the current flowing to the electromagnet 21 may be controlled based on a control signal supplied from the control section 26. In this case, it is possible to provide a configuration in which the electromagnet 21 is not electrically connected to the power receiving circuit 22, the battery 24, and the like. It is to be noted that, in the present modification as well, the structural mounting location of the electromagnet 21 is similar to that in the above-described embodiment, and the electromagnet 21 may be disposed, for example, in the layout illustrated in FIG. 4.

In the present modification, in a manner similar to that of the above-described embodiment, when electric power supply from the power transmission section 1A to the power receiving section 2A is performed in feeding, DC power outputted from the power receiving section 2A is supplied to the battery 24 based on control of the control section 26 and the charging circuit 23. In this process, in the present modification, the control section 26 energizes the electromagnet 21, while allowing charging operation of the above-described battery 24. As a result, the electromagnet 21 is magnetized, and the electronic device 2 is attracted to the charger 1. In this way, in the present modification, the power receiving section 2A receives the electric power from the power transmission section 1A, and the control section 26 energizes the electromagnet 21 using the received electric power. In other words, the electromagnet 21 is magnetized based on the electric power received by the power receiving section 2A. Subsequently, when the electronic device 2 is fully charged, the control section 26 stops the electric power supply to the battery 24, and also stops the energizing of the electromagnet 21. As a result, the electromagnet 21 loses the magnetic force, and the attraction of the electronic device 2 to the charger 1 is released, which finishes the charging (completes the charging).

In this way, in the present modification as well, the electronic device 2 is allowed to be attracted to the charger 1 by the attractive force of the electromagnet 21 in a feeding period, and the attraction is allowed to be released when the charging is finished. Therefore, it is possible to obtain effects similar to those of the above-described embodiment.

In addition, in the present modification, the control section 26 is allowed to control the energizing of the electromagnet 21 and therefore, for example, in a case such as when it is desirable to stop the feeding at arbitrary timing during the feeding, the attraction of the electronic device 2 to the charger 1 may be released by forcibly stopping the energizing of the electromagnet 21. For example, in a case such as when a temperature sensor is additionally disposed in the electronic device 2 and when abnormal heat or the like is detected, the electronic device 2 may be separated from the charger 1 by releasing the attraction by stopping the energizing of the electromagnet 21. This makes it possible to enhance the safety further.

[Modification 2]

Figure 10:
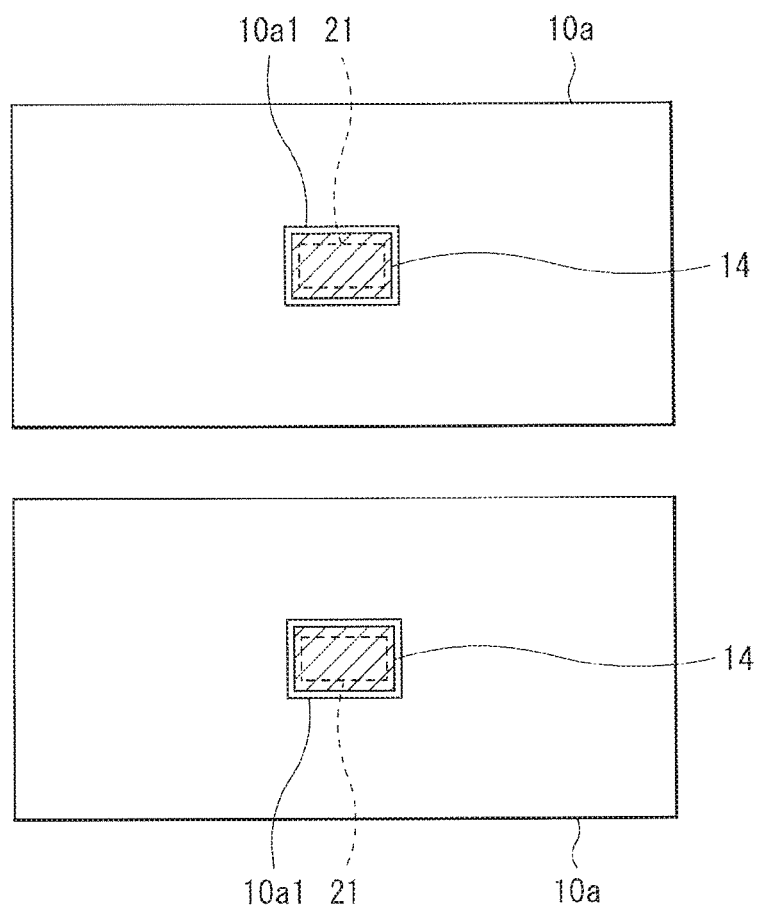
FIG. 10 is a schematic diagram illustrating a layout example of an electrode in a charger according to Modification 2.

FIG. 10 illustrates an example of an electrode layout of the charger 1 according to Modification 2. It is to be noted that in FIG. 10, a mounting location of the electromagnet 21 provided in the electronic device 2 is indicated by a broken line. In the present modification, unlike the above-described embodiment, a fixing section 14 is provided separately from the first electrode (a first electrode 10a) of the charger 1. For example, an opening 10a1 may be provided in a selective region of each of the two first electrodes 10a disposed with a predetermined space therebetween, for example, in a region near a central part of each of the first electrodes 10a. The fixing section 14 is formed in the opening 10a1. In this case, a material of the first electrode 10a may be a typical electrode material having conductivity. The fixing section 14 may not necessarily have conductivity, as long as the fixing section 14 is configured of a material to be attracted to a magnet. It is to be noted that the first electrode 10a has a configuration and functions similar to those of the first electrode 10 in the above-described embodiment, except the material and having the opening 10a1.

In this way, the fixing section 14 may be provided separately from the first electrode 10a. Effects similar to those of the above-described embodiment may be obtained in this case as well. In addition, providing the fixing section 14 makes it easy to finely set an attraction location of the electromagnet 21, which improves alignment accuracy of the electronic device 2. Specifically, the electromagnet 21 and the fixing section 14 are designed to face each other at a position where the electric power transmission efficiency becomes a maximum (for example, at a position where the second electrode 20 faces a point near a center of the first electrode 10a). This makes it possible to fix the electronic device 2 to the charger 1 at the position where the electric power transmission efficiency becomes the maximum.

It is to be noted that the fixing section 14 is not limited in particular in terms of mounting location and quantity. These mounting location and quantity may be appropriately set, for example, according to the mounting location and quantity of the electromagnet 21 for the above-described reasons.

[Modification 3]

Figure 11A:
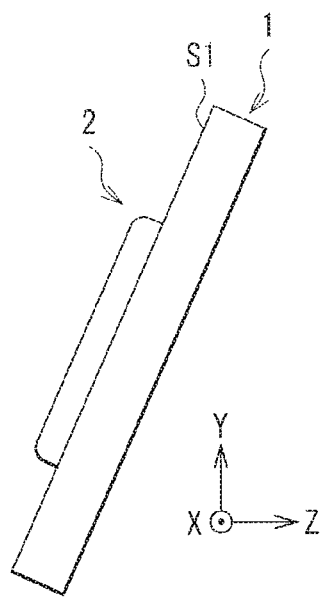
FIG. 11A is a schematic diagram illustrating an installation example of a charger and an electronic device according to Modification 3.
Figure 11B:
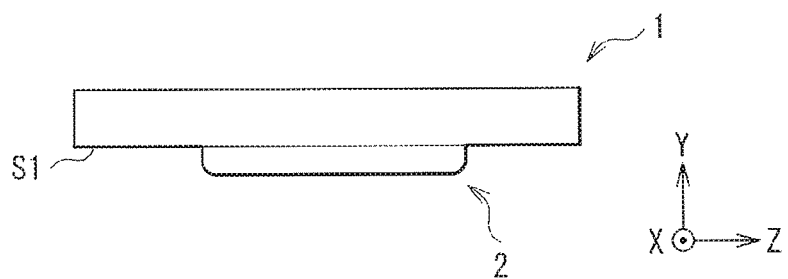
FIG. 11B is a schematic diagram illustrating another installation example of the charger and the electronic device according to Modification 3.
Figure 11C:
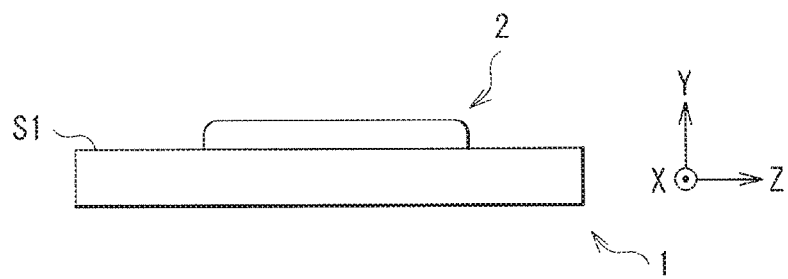
FIG. 11C is a schematic diagram illustrating still another installation example of the charger and the electronic device according to Modification 3.

FIGS. 11A to 11C each schematically illustrate a schematic configuration of a feed system according to Modification 3. In the above-described embodiment, the case in which the charger 1 is vertically installed in the feed system 3 has been described as an example. However, the charger 1 (the power transmission section 1A) may not be necessarily installed along a vertical plane. For example, as illustrated in FIG. 11A, the charger 1 may be arranged such that the electronic device 2 and the charger 1 come in contact with each other on a plane inclined from a vertical plane (an XY plane). In this case as well, as with the case of the vertical installation, it is possible to easily confirm the charging state of the electronic device 2 by attraction and release of the attraction of the electronic device 2. Therefore, it is possible to enhance visibility and to suppress interposition of foreign matter.

Alternatively, as illustrated in FIGS. 11B and 11C, the electronic device 2 and the charger 1 may be in contact with each other in a horizontal plane (an XZ plane). During the feeding, the electronic device 2 is attracted to the charger 1 by the attractive force of the electromagnet 21. Therefore, it is possible to install the charger 1 so that the power transmission surface S1 faces in a vertically downward direction, as illustrated in FIG. 11B. Alternatively, as illustrated in FIG. 11C, the charger 1 may be installed along a horizontal plane, so that the power transmission surface S1 faces in a vertically upward direction, as with a typical charging cradle, a charging tray, and the like. In these cases as well, it is possible to perform the feeding efficiently, by suppressing a misalignment in a feeding period, by the attraction of the electronic device 2 to the charger 1.

The present disclosure has been described with reference to some embodiment and modifications, but is not limited thereto and may be variously modified. For example, in the above-described embodiment and the like, the electric field coupling method has been used as an example of the method of charging between the electronic device 2 and the charger 1. However, besides this method, a magnetic field coupling method, an electromagnetic induction method, and the like may be used in the power receiving unit, the power transmission unit, and the feed system according to embodiment of the present disclosure.

Further, the shape, quantity, and mounting location of the electrode (the first electrode 10 and the second electrode 20) in each of the electronic device 2 and the charger 1 of the above-described embodiment are not limited to those in the above-described layout.

Furthermore, in the above-described embodiment and the like, a mobile electronic device has been described as an example of the device to be fed. However, the device to be fed may be any type of device (for example, a vehicle such as an electric car) other than such an electronic device.

In addition, in the above-described embodiment and the like, each component of the charger 1 (the power transmission unit) and the electronic device 2 (the power receiving unit) has been specifically described. However, it is not necessary to provide all the components, or other component may be further provided. For example, a function of performing some kind of control, a display function, a function of detecting admixture of a substance such as dissimilar metal, and/or the like may be provided in the power transmission unit and/or the power receiving unit.

Moreover, in the above-described embodiment and the like, the case in which only one electronic device is provided in the feed system has been mainly described as an example, but this is not limitative, and a plurality of (two or more) electronic devices may be provided in the feed system.

It is to be noted that the effects described herein are provided as an example and may be other effects, or may further include other effect.

It is possible to achieve at least the following configurations from the above-described example embodiments of the disclosure.

(1) A power receiving unit including:
   a power receiving section configured to receive electric power from a power transmission unit; and
   an electromagnet configured to be magnetized based on the electric power received from the power transmission unit.

(2) The power receiving unit according to (1), wherein the electromagnet is electrically connected in series between the power receiving section and a load.

(3) The power receiving unit according to (1) or (2), wherein the power receiving section includes
   a second electrode configured to be paired with a first electrode provided in the power transmission unit, and
   a power receiving circuit connected to the second electrode and including a rectifier circuit.

(4) The power receiving unit according to (3), wherein the second electrode and the electromagnet are provided in proximity to a power receiving surface.

(5) The power receiving unit according to (3) or (4), wherein the second electrode has a flat shape and has an opening in a selective region of the flat shape, and
   the electromagnet is provided in the opening of the second electrode.

(6) The power receiving unit according to any one of (1) to (5), further including a control section configured to control a current that flows to the electromagnet.

(7) A power transmission unit including:
   a power transmission section configured to supply electric power to a power receiving unit; and
   a fixing section including a material to be attracted to a magnet,
   wherein the power receiving unit includes
   a power receiving section configured to receive the electric power from the power transmission section, and
   an electromagnet configured to be magnetized based on the electric power received from the power transmission section.

(8) The power transmission unit according to (7), wherein the power transmission section is provided along a vertical plane or an inclined plane.

(9) The power transmission unit according to (7) or (8), wherein the fixing section is configured of iron (Fe), nickel (Ni), or cobalt (Co), or a material including any of iron, nickel, and cobalt.

(10) The power transmission unit according to any one of (7) to (9), wherein the power transmission section includes
   a first electrode configured to be paired with a second electrode provided in the power receiving unit, and
   a power transmission circuit connected to the first electrode and including an AC-signal generation source.

(11) The power transmission unit according to (10), wherein the first electrode also serves as the fixing section.

(12) The power transmission unit according to (10) or (11), wherein the fixing section is provided in a selective region corresponding to a mounting location of the electromagnet of the power receiving unit.

(13) A feed system including:
   a power receiving unit and a power transmission unit configured to allow feeding by being brought into contact with or proximity to each other,
   wherein the power receiving unit includes a power receiving section configured to receive electric power from the power transmission unit, and an electromagnet configured to be magnetized based on the electric power received from the power transmission unit, and the power transmission unit includes a power transmission section configured to supply the electric power to the power receiving unit, and a fixing section including a material to be attracted to a magnet.

(14) The feed system according to (13), wherein the power transmission unit is installed to be in contact with the power receiving unit on a vertical plane or an inclined plane.

(15) The feed system according to (14), wherein the power transmission unit is installed on a wall surface.

(16) The feed system according to any one of (13) to (15), wherein in the power receiving unit, the electromagnet is electrically connected in series between the power receiving section and a load.

(17) The feed system according to any one of (13) to (16), wherein the power receiving unit further includes a control section configured to control a current that flows to the electromagnet.

It should be understood by those skilled in the art that various modifications, combinations, sub-combinations, and alterations may occur depending on design requirements and other factors insofar as they are within the scope of the appended claims or the equivalents thereof.

What is claimed is:

1. A power transmission unit comprising:
a power transmission section configured to supply wireless electric power to a power receiving unit,
a first opening formed at center of the power transmission section; and
a fixing section including a material to be attracted to a magnet, the fixing section is disposed in the first opening,
wherein the power receiving unit includes:
   a power receiving section configured to receive the wireless electric power from the Power transmission section,
   a second opening is formed at center of the power receiving unit, and
   an electromagnet configured to be magnetized based on the wireless electric power received from the power transmission section, the electromagnet is disposed in the second opening, and
wherein the fixing section is attracted to the electromagnet when the power receiving section receives the wireless electric power.

2. The power transmission unit according to claim 1, wherein the power transmission section is provided along a vertical plane or an inclined plane.

3. The power transmission unit according to claim 1, wherein the fixing section is configured of iron (Fe), nickel (Ni), or cobalt (Co), or a material including any of iron, nickel, and cobalt.

4. The power transmission unit according to claim 1, wherein the power transmission section includes a first electrode configured to be paired with a second electrode provided in the power receiving unit, and a power transmission circuit connected to the first electrode and including an AC-signal generation source.

5. The power transmission unit according to claim 4, wherein the first electrode also serves as the fixing section.

6. The power transmission unit according to claim 4, wherein the fixing section is provided in a selective region corresponding to a mounting location of the electromagnet of the power receiving unit.

7. A power transmission unit comprising:
a power transmission section configured to energize an electromagnet in a power receiving apparatus by wirelessly radiating electric power to the power receiving apparatus;
a first opening formed at center of the power transmission section, and
a fixing section made of a material that affixes the power receiving apparatus to a surface of the power transmission unit when the electromagnet is energized by the electric power,
wherein the fixing section is disposed in first opening to be coupled with an electromagnet disposed in a second opening of the power receiving apparatus when the power receiving section receives the electric power.

8. The power transmission unit according to claim 7, wherein the material is iron (Fe), nickel (Ni), or cobalt (Co), or a material including any of iron, nickel, and cobalt.

9. The power transmission unit according to claim 7, wherein a magnetic force attracts the electromagnet to the material when the power transmission unit wirelessly radiates the electric power.

10. The power transmission unit according to claim 7, wherein the power receiving apparatus is detachable from the power transmission unit when the power transmission unit does not wirelessly radiate the electric power.

11. The power transmission unit according to claim 7, wherein the electromagnet is de-energized when the power transmission unit does not wirelessly radiate the electric power.

12. The power transmission unit according to claim 7, wherein the power transmission section is configured to wirelessly radiate the electric power when the power receiving apparatus is brought into contact with the surface of the power transmission unit.

13. The power transmission unit according to claim 7, wherein a surface of the power receiving apparatus is brought into contact with the surface of the power transmission unit, an area of the surface of the power transmission unit is larger than an area of the surface of the power receiving apparatus.

14. The power transmission unit according to claim 7, wherein an electrode in the power transmission section is configured to wirelessly radiate the electric power.

15. The power transmission unit according to claim 14, wherein the electrode is the fixing section.

16. The power transmission unit according to claim 14, wherein the electrode surrounds the fixing section in an electrode layout of the power transmission unit.

17. The power transmission unit according to claim 7, further comprising:
a communication section configured to receive a command from the power receiving apparatus.

18. The power transmission unit according to claim 17, wherein the command instructs the power receiving apparatus to halt wirelessly radiating the electric power.

19. A power receiving unit comprising:
a power receiving section configured to receive wireless electric power from a power transmission unit;
a first opening formed at center of the power receiving unit, and an electromagnet configured to be magnetized based on the wireless electric power received from the power transmission section, and wherein the electromagnet is disposed in the first opening, and the electromagnet is coupled with a fixing section disposed in a second opening which is formed at center of the power transmission unit when the power receiving section receives the wireless electric power.

20. The power receiving unit according to claim 19, wherein the electromagnet is electrically connected in series between the power receiving section and a load.

21. The power receiving unit according to claim 19, wherein the power receiving section includes a second electrode configured to be paired with a first electrode provided in the power transmission unit, and a power receiving circuit connected to the second electrode and including a rectifier circuit.

22. The power receiving unit according to claim 21, wherein the second electrode and the electromagnet are provided in proximity to a power receiving surface.

23. The power receiving unit according to claim 22, wherein the second electrode has a flat shape and has an opening in a selective region of the flat shape, and the electromagnet is provided in the opening of the second electrode.

24. The power receiving unit according to claim 19, further comprising a control section configured to control a current that flows to the electromagnet.

\* \* \* \* \*